US008269619B2

(12) United States Patent
Lee

(10) Patent No.: US 8,269,619 B2
(45) Date of Patent: Sep. 18, 2012

(54) WIRELESS LIGHT INDICATION AND CONTROL DEVICE

(75) Inventor: Chien-Liang Lee, Miao-Lih Hsien (TW)

(73) Assignee: Abocom Systems, Inc., Miao-Lih Hsien (TW)

( * ) Notice: Subject to any disclaimer, the term of this patent is extended or adjusted under 35 U.S.C. 154(b) by 605 days.

(21) Appl. No.: 12/557,115

(22) Filed: Sep. 10, 2009

(65) Prior Publication Data

US 2011/0057781 A1 Mar. 10, 2011

(51) Int. Cl.
*B60Q 1/34* (2006.01)

(52) U.S. Cl. ........ 340/475; 340/432; 340/463; 340/468; 340/539.1; 362/105; 362/106

(58) Field of Classification Search .................. 340/432, 340/463, 475, 539.1, 468, 815.4, 815.45, 340/825.69, 825.72; 362/105, 106
See application file for complete search history.

(56) References Cited

U.S. PATENT DOCUMENTS

| | | | | |
|---|---|---|---|---|
| 4,760,373 A * | 7/1988 | Reilly | ............................ | 340/432 |
| 5,072,209 A * | 12/1991 | Hori et al. | ..................... | 340/432 |
| 6,982,633 B2 * | 1/2006 | Burdick | ......................... | 340/432 |
| 7,455,139 B2 * | 11/2008 | Lee | ................. | 180/167 |
| 7,948,367 B1 * | 5/2011 | Arauza | ......................... | 340/475 |
| 2008/0084688 A1* | 4/2008 | White | ........................... | 362/105 |
| 2008/0088423 A1* | 4/2008 | Liu | ................ | 340/432 |
| 2010/0134272 A1* | 6/2010 | Palacios | ........................ | 340/475 |

FOREIGN PATENT DOCUMENTS

TW 588784 5/2004
TW M351002 2/2009

* cited by examiner

*Primary Examiner* — Hung T. Nguyen
(74) *Attorney, Agent, or Firm* — Muncy, Geissler, Olds & Lowe, PLLC

(57) ABSTRACT

A wireless light indication and control device connected with a helmet is provided. The wireless light indication and control device includes a direction detector, a wireless transmitter, and at least one light element, wherein the direction detector senses a movement of the helmet to generate a turning signal, the wireless transmitter receives the turning signal and cooperates with a frequency hopping unit and a matching unit to generate a wireless signal, and the light element includes a wireless receiver for receiving the wireless signal. As the user wears the helmet of the present invention, the light can generate warning effect based on the movement of the helmet, so as to provide the user a more comprehensive traffic safety.

10 Claims, 4 Drawing Sheets

WIRELESS LIGHT INDICATION AND CONTROL DEVICE

FIELD OF THE INVENTION

The present invention is related to a light indication device used for a helmet and a transportation and more particular to a wireless light indication and control device.

BACKGROUND OF THE INVENTION

Recently, bicycle riding has become a fever. However, in Taiwan, because the bike lanes are still not popular, the bicycles always have to barrow the motorcycle lanes and compete therewith, which easily causes danger, especially during the rush hour. And, since most bicycles are not equipped with the warning device, the rider's safety is highly threatened.

Nowadays, wireless technology is getting matured and has applied to various kinds of daily used products, such as mobile phones and computers. R.O.C. patent No. 588784 has disclosed the "Structure of brake warning light", wherein, as shown in FIG. 1, a warning lamp 1 is mounted on a helmet 2 which can receive the signals from a transmitter connected with the brake light of the motorcycle, so as to show the braking light as a warning on the helmet. But, other information, such as turning signals, is absent.

In R.O.C. patent No. M351002, entitled "Helmet with turning signal lights", as shown in FIG. 2, a control box connected with a turning signal module on a motorcycle can wirelessly transmit turning signals to a helmet 3, so that a light module 4 on the helmet 3 can show the turning signals concurrently. Although the turning signals can be shown, the warning control is triggered manually, and the user might not have an instant response in an emergency, so that the light on the helmet might not be lighted in time and the accident still might happen.

Therefore, in addition to the warning device mounted on the bicycle, the helmet 3 and the light module 4 also should be improved for solving the defect of manual operation. Further, it is also important to avoid the signal interference among multiple receivers on the helmets and multiple transmitters on the bicycles, otherwise not only the warning function will be influenced, the rider's safety might also be impaired.

SUMMARY OF THE INVENTION

The object of the present invention is to provide a wireless light indication and control device, in which the light indication is controlled by the helmet and which provides functions of frequency hopping and matching.

For achieving the object described above, the present invention provides a wireless light indication and control device connected with a helmet. The wireless light indication and control device includes a direction detector, a wireless transmitter, and at least one light element, wherein the direction detector is mounted on the helmet for sensing a movement of the helmet so as to generate a turning signal, the wireless transmitter is mounted on the helmet and electrically connected with the direction detector for receiving the turning signal and for cooperating with a frequency hopping unit and a matching unit to generate a wireless signal, and the light element includes a wireless receiver for receiving the wireless signal.

Accordingly, the wireless light indication and control device of the present invention is advantageous that:

1. The direction detector mounted on the helmet can generate the turning signal based on sensing the movement of user's head and then wirelessly transmits the turning signal to the light element, so that no matter during the normal riding condition or in an emergency, the warning indication can be generated and shown concurrently, thereby improving the safety.
2. The first light module on the helmet includes at least two indication lights which can respectively indicate the right turn and the left turn, so as to provide the bicycle the turning signals like other transportations.
3. The frequency hopping unit and the matching unit used for wireless transmission can avoid the wireless signal interference or failure when multiple wireless light indication and control devices are gathering around, so as to further improve the riding safety.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
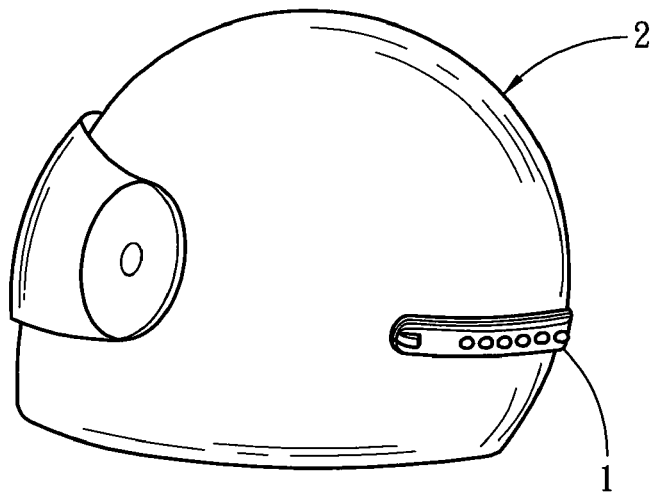
FIG. 1 is a schematic view showing a prior art.
Figure 2:
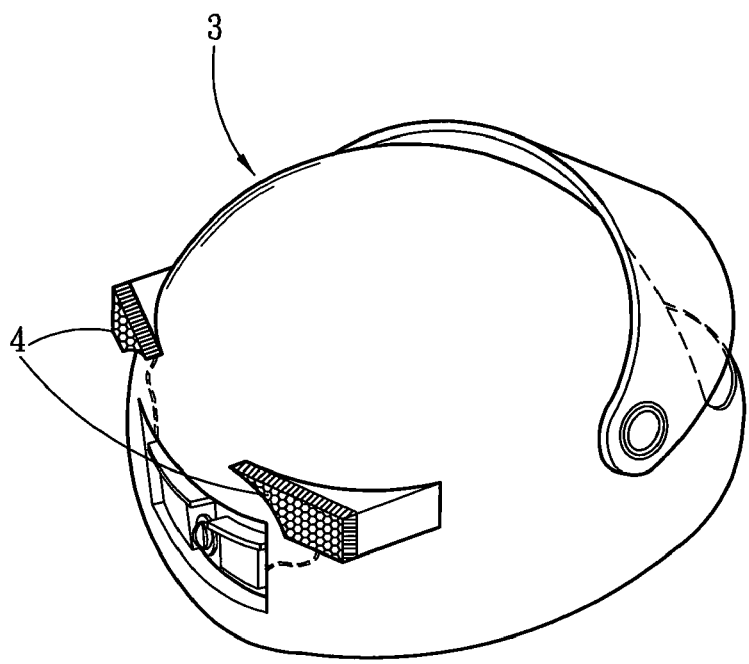
FIG. 2 is a schematic view showing another prior art.
Figure 3:
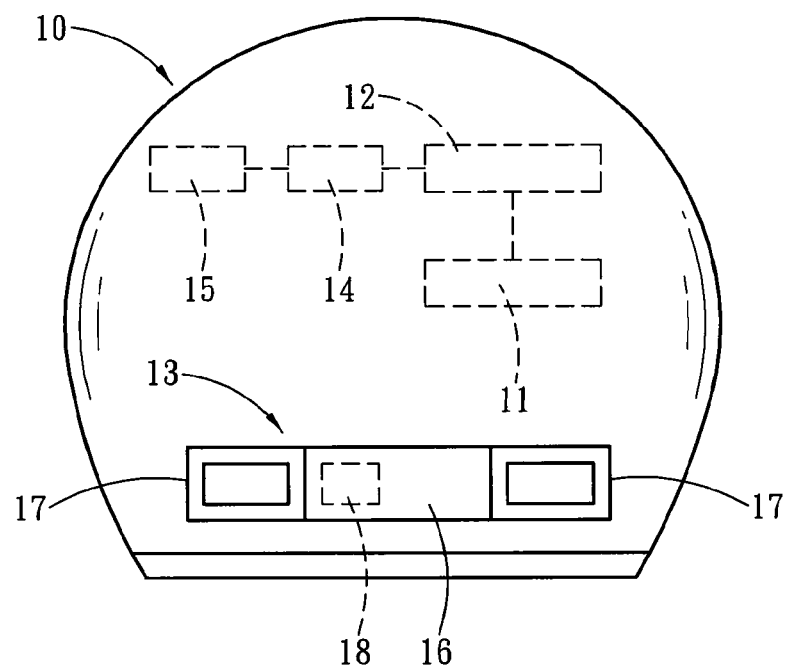
FIG. 3 is a schematic view showing a helmet of the present invention.

Please refer to FIG. 3 which shows a helmet according to the present invention. The present invention is related to a wireless light indication and control device mounted on a helmet 10. The wireless light indication and control device includes a direction detector 11, a wireless transmitter 12 and at least one light element 13. The direction detector 11 senses the movement of the helmet 10 and generates a turning signal according thereto, the wireless transmitter 12 mounted on the helmet 10, electrically connected with the direction detector 11, receives the turning signal and cooperates with a frequency hopping unit 14 and a matching unit 15 to generate a wireless signal, and the light element 13 receives the wireless signal via a wireless receiver 18 thereof.

The light element 13 can further include a power supply device 16, which can be a general battery or a solar battery. In this embodiment, the power supply device 16 is a general battery. Besides, the light element 13 also includes at least two indication lights 17 for showing the turning signals.

Figure 4:
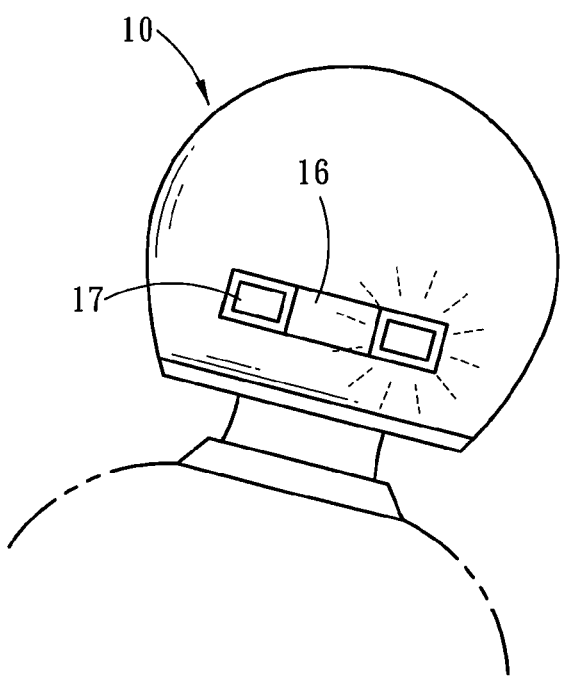
FIG. 4 is a schematic view showing a first operation of the present invention.
Figure 5:
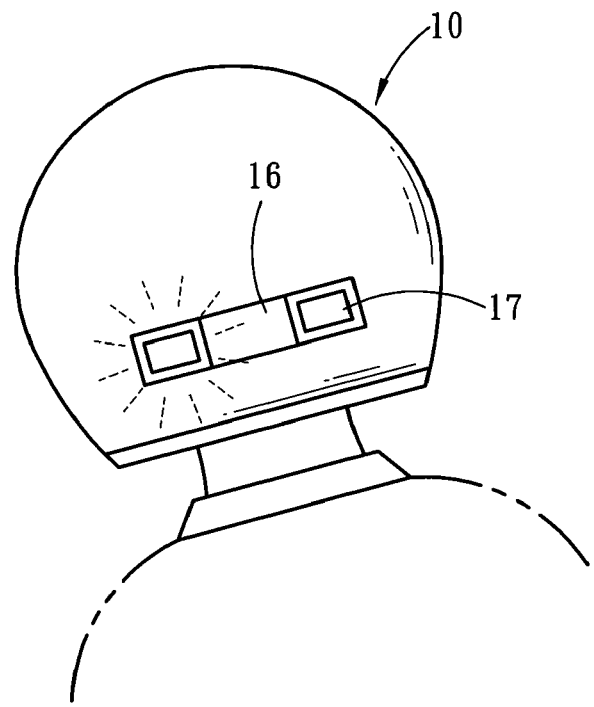
FIG. 5 is a schematic view showing a second operation of the present invention.

Please refer to FIG. 3, FIG. 4 and FIG. 5 which respectively show the schematic view, a first operation, and a second operation of the helmet. When the user wears the helmet 10 during riding, the movement of the user's head as turning right will be sensed by the direction detector 11 for generating the turning signal, as shown in FIG. 4. After the wireless transmitter 12 receives the turning signal, the cooperation with the frequency hopping unit 14 and the matching unit 15 can generate the wireless signal for sending to the light element 13. Therefore, the light element 13 can indicate the right turn of the riding. Similarly, as shown in FIG. 5, when the user turns left and accordingly moves the head, the light element 13 can show the indication of left turn. Then, as long as the user keeps moving forward after turning with the helmet 10, the indication of the light element 13 can be released.

Figure 6:
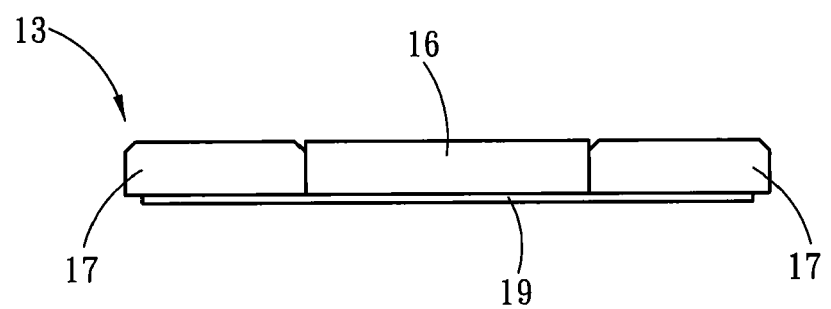
FIG. 6 is a side view showing the light element of the present invention.
Figure 7:
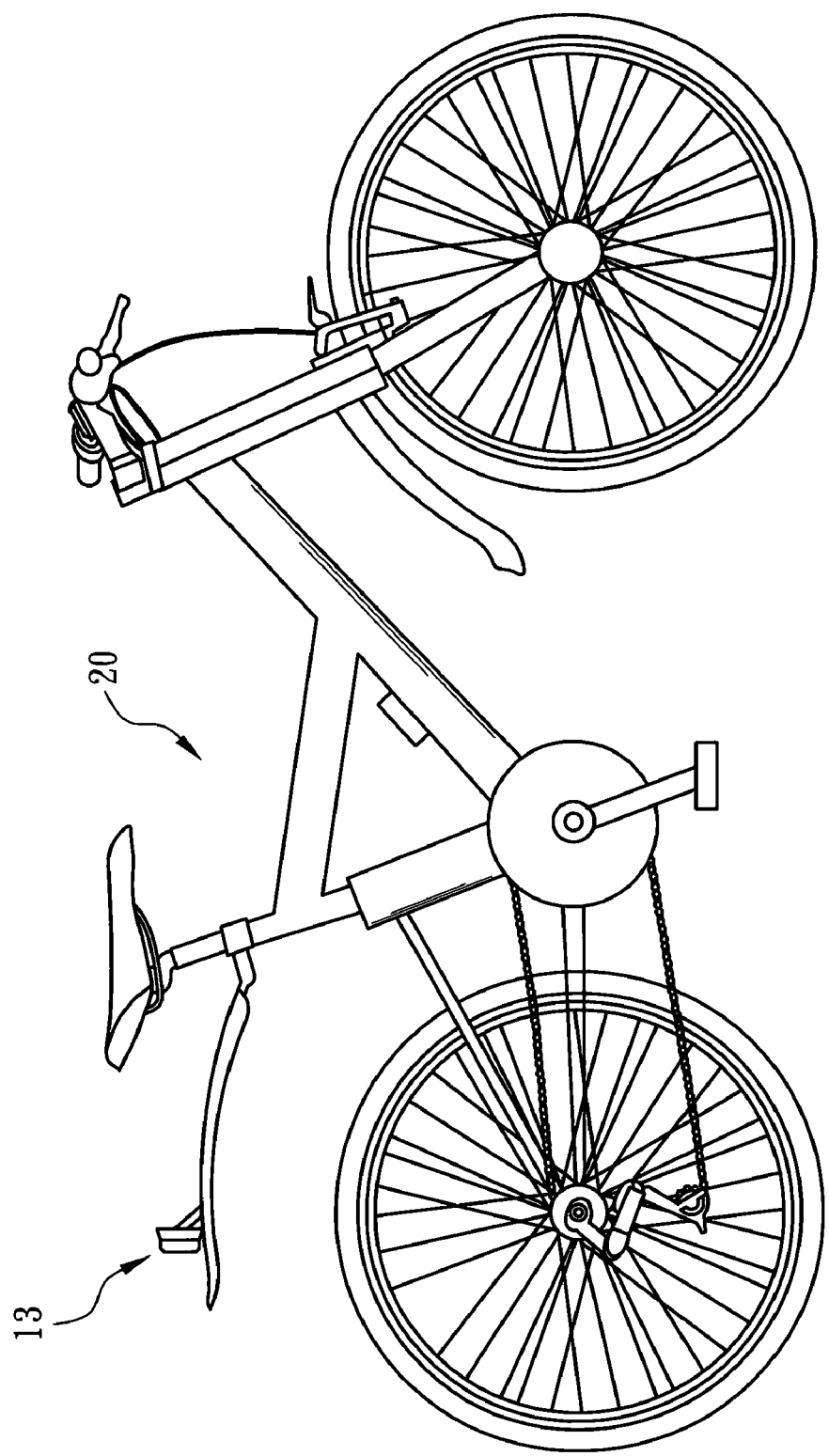
FIG. 7 is a schematic view showing of a bicycle which employs the present invention.

Please refer to FIG. 3, FIG. 6 and FIG. 7 which show the schematic view of the helmet, a side view of the light element and a schematic view of a bicycle which employs the present invention. The light element 13 according to the present invention, in addition to being mounted on the helmet 10, also can be mounted on a transportation 20. The mounting of the light element 13 on the helmet 10 can be achieved by adhering, fastening or engaging. In this embodiment, the light element 13 is adhered to the helmet 10. And, as shown in FIG. 6, the light element 13 can further include an adhesive surface 19 for attachment. Moreover, FIG. 7 shows that the light element 13 is mounted on the transportation 20 which can be achieved by adhering, fastening, or engaging. Here, the transportation 20 is a bicycle.

Furthermore, in the present invention, the frequency hopping unit 14 adopts AFH (Adaptive Frequency Hopping) technology which is generally used for bi-directional wireless communication and data encryption in the wireless communication, wherein the wireless communication frequency division allows channel switching and hopping as transmission and receiving so as to ensure the communication quality. The matching unit 15 encrypts the data before transmission, so as to ensure the data security and also the correctness of data destination. Accordingly, even multiple users are gathering around a neighborhood, the frequency hopping unit 14 and the matching unit 15 also can automatically detect the frequency of other wireless light indication and control devices and avoid the interference thereamong. Therefore, the transmission error or failure of the light element 13 which might cause traffic danger can be prevented.

In the aforesaid, the present invention utilizes the direction detector 11 to sense the movement of the helmet 10 for indicating the turn of the user's riding so as to make up the deficiency that the bicycle does not have the turning signals for warning like the motorcycle. The wireless transmission technology provides the flexibility in mounting the light element 13 on the helmet 10 or the transportation 20. Moreover, the light element 13 includes two indication lights 17 which can show the right turn and the left turn indications. Besides, the frequency hopping unit 14 and the matching unit 15 can prevent the wireless signal interference as multiple wireless light indication and control devices are gathering around, so as to further ensure traffic safety.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wireless light indication and control device, connected with a helmet, comprising:
   a direction detector, mounted on the helmet, for sensing a movement of the helmet so as to generate a turning signal;
   a wireless transmitter, mounted on the helmet and electrically connected with the direction detector, for receiving the turning signal and for cooperating with a frequency hopping unit and a matching unit to generate a wireless signal; and
   at least one light element, having a wireless receiver for receiving the wireless signal.

2. The device as claimed in claim 1, wherein the light element further includes a power supply device which is one of a general battery and a solar battery.

3. The device as claimed in claim 2, wherein the power supply device is a solar battery.

4. The device as claimed in claim 1, wherein the light element has at least two indication lights for receiving and showing the turning signal.

5. The device as claimed in claim 1, wherein the frequency hopping unit adopts AFH (Adaptive Frequency Hopping) technology.

6. The device as claimed in claim 1, wherein the light element is mounted on one of the helmet and a transportation.

7. The device as claimed in claim 6, wherein the light element is mounted on the helmet by adhering, fastening, or engaging.

8. The device as claimed in claim 7, wherein the light element is adhered to the helmet.

9. The device as claimed in claim 6, wherein the light element is mounted on the transportation by adhering, fastening, or engaging.

10. The device as claimed in claim 6, wherein the transportation is a bicycle.

* * * * *